(12) United States Patent
Hendriks et al.

(10) Patent No.: US 8,398,906 B2
(45) Date of Patent: Mar. 19, 2013

(54) PARTICLES COMPRISING COMPOSITE OF PARA-ARAMID AND ADDITIVE MATERIAL

(75) Inventors: Anton Johannes Josef Hendriks, Lent (NL); Mirjam Ellen Oldenzeel, Westervoort (NL); Johannus Maria Bergmans, Zevenaar (NL); Tetsuya Akamatsu, Osaka (JP)

(73) Assignee: Teijin Aramid B.V., Arnhem (NL)

( * ) Notice: Subject to any disclaimer, the term of this patent is extended or adjusted under 35 U.S.C. 154(b) by 496 days.

(21) Appl. No.: 12/450,326

(22) PCT Filed: Mar. 28, 2008

(86) PCT No.: PCT/EP2008/002445
§ 371 (c)(1),
(2), (4) Date: Sep. 22, 2009

(87) PCT Pub. No.: WO2008/122374
PCT Pub. Date: Oct. 16, 2008

(65) Prior Publication Data
US 2010/0056731 A1 Mar. 4, 2010

(30) Foreign Application Priority Data
Apr. 5, 2007 (EP) .................................... 07007167

(51) Int. Cl.
*D02G 3/02* (2006.01)
*D21H 13/26* (2006.01)
*D01F 6/60* (2006.01)
*D01F 6/90* (2006.01)

(52) U.S. Cl. ........... 264/171.1; 264/172.11; 264/211.12; 264/211.13; 264/211.14; 264/638; 264/639; 264/640; 428/357; 428/359; 428/395; 524/538

(58) Field of Classification Search ............... 264/171.1, 264/172.11, 211.12, 211.13, 211.14, 638, 264/639, 640, 642; 524/538; 428/357, 359, 428/395
See application file for complete search history.

(56) References Cited

U.S. PATENT DOCUMENTS
3,673,143 A 6/1972 Bair et al.
5,028,372 A 7/1991 Brierre et al.
6,162,538 A * 12/2000 LaNieve et al. ............... 428/373

FOREIGN PATENT DOCUMENTS
WO WO 2004/099476 A1 11/2004
WO WO 2005/059211 A1 6/2005
WO WO 2005/059247 A1 6/2005

* cited by examiner

Primary Examiner — Ana Woodward
(74) Attorney, Agent, or Firm — Oliff & Berridge, PLC

(57) ABSTRACT

The invention pertains to a method for making a polymer-additive composite particle from a dope by jet spinning the dope to obtain a pulp, fibril or fibrid, wherein the solvent of the dope is selected from N-methyl-2-pyrrolidone, N,N'-dimethylformamide, N,N'-dimethylacetamide, tetramethylurea, and 4 to 75 wt % of a composition consisting of 2 to 95 wt % of a para-aramid polymer and 5-98 wt % of a solid additive material, to a total of 100 wt %, and wherein the aramid polymer is dissolved in the solvent; or coagulating the dope by means of a rotor-stator apparatus in which the polymer solution is applied through the stator on the rotor so that the precipitating polymer-additive composite particle is subjected to shear forces while they are in a plastic deformable stage.

4 Claims, No Drawings

PARTICLES COMPRISING COMPOSITE OF PARA-ARAMID AND ADDITIVE MATERIAL

The invention pertains to a dope comprising para-aramid and additive material, to a method of making particles using said dope, and to particles comprising a composite of para-aramid and additive material.

Aramid particles, such as fibrids, fibrils, short fibers and pulp are commonly used for various applications, such as for making paper, brake linings, gaskets, coupling plates, and the like. For specific, mostly high quality applications, further improvement of the existing particles is still required. It is known to add additive materials to such particles in order to adjust its properties. When additive materials are added to those aramid particles some disadvantages may occur, such as in paper making processes that may have problems with retaining additive materials during the paper formation, leading to the need of using chemicals for additive retention. Furthermore, pollution of systems with additive materials may hamper the process of making paper or other products.

It is therefore an objective of the present invention to provide para-aramid particles having improved properties with regard to the solution of the above problems.

To this end the invention pertains to a method for making a polymer-additive composite particle from a dope by:
i) jet spinning the dope to obtain a pulp, fibril or fibrid, wherein the dope comprises a solvent and 4 to 75 wt % of a composition consisting of 2 to 95 wt % of a para-aramid polymer and 5-98 wt % of a solid additive material, to a total of 100 wt %, and wherein the aramid polymer is dissolved in the solvent; or
ii) coagulating the dope by means of a rotor-stator apparatus in which the polymer solution is applied through the stator on the rotor so that the precipitating polymer-additive composite particle is subjected to shear forces while they are in a plastic deformable stage.

According to another aspect the invention relates to a dope that is suitable for use in such process, which dope comprises a solvent and 4 to 75 wt % of a composition consisting of 2 to 95 wt % of a para-aramid polymer and 5-98 wt % of a solid additive material, to a total of 100 wt %, and wherein the aramid polymer is dissolved in the solvent.

In another aspect the invention pertains to a product thus obtained.

The term jet spinning means a spinning process as, for instance, has been disclosed in WO 2004/099476. According to this method the liquid para-aramid polymerization solution is supplied with the aid of a pressure vessel to a spinning pump to feed a nozzle for jet spinning to pulp-like fibers under pressure. The liquid para-aramid solution is spun through a spinning nozzle into a zone of lower pressure. Under the influence of the expanding air flow the liquid spinning solution is divided into small droplets and at the same time or subsequently oriented by drawing. Then the pulp-like fibers are coagulated in the same zone by means of applying a coagulant jet and the formed pulp is collected on a filter, or directly processed to paper, or the fibers are laid down on a plate to directly form paper and thereafter coagulated. The coagulant may be selected from water, mixtures of water, NMP, and $CaCl_2$, or any other suitable coagulant.

The para-aramid polymer may be any aromatic amide polymers or copolymer which can be obtained from condensation polymerization of a para-oriented aromatic diamine and a para-oriented aromatic dicarboxylic acid halide and optionally other monomers (hereinafter abbreviated to "para-aramids") have hitherto been known to be useful in various fields such as fiber, pulp, and the like because of their high strength, high elastic modulus, and high heat resistance.

As a typical member of para-aramid, poly(para-phenylene terephthalamide) (hereinafter abbreviated to PPTA) can be referred to. PPTA has been produced in polar amide solvent/salt systems by carrying out a solution polymerization reaction in a polar amide solvent. The PPTA is precipitated, neutralized, washed with water, and dried, and once isolated as a polymer. Then, the polymer is dissolved in a solvent and made into a PPTA fiber by the process of wet spinning. In this step, any suitable solvent can be used as the solvent of the spinning dope. The spinning dope usually shows optical anisotropy.

According to many prior processes, pulp is produced by mechanically cutting such long (continuous) PPTA fiber, dispersing the cut fiber in water and fibrillating the dispersed fiber by mechanical shearing means such as beating or the like, followed by filtration and drying. In such prior art processes, the steps of polymerization, spinning and pulp making are completely independent of one another. That is, the step of polymerization uses a polar amide solvent, the step of spinning uses concentrated sulfuric acid as solvent, and the step of pulp making uses water as a dispersing medium.

The pulp thus made is defined as fiber stem which is highly fibrillated. The fibrillated part is mentioned fibrils, which are highly entangled and have a high aspect ratio and a large surface area. Thus aramid pulps are fibrillated particles that are used for making paper, gaskets, brake linings, and the like. Pulp generally can thus be made from spun fiber, by performing cutting and fibrillation steps thereon, but also direct methods without first spinning the polymer to a fiber are known.

Such direct pulp making method has been disclosed in the art, for instance in U.S. Pat. No. 5,028,372. According to this method a para-aramid pulp was made by forming a para-aramid polymer solution, extruding said solution onto a conveyor, incubating the solution on the conveyor until it forms a gel, and cutting this gel and isolating the pulp thereof.

A method of making fibrils by using jet spinning has been disclosed in WO 2005/059211, comprising the steps a. polymerizing an aromatic diamine and an aromatic dicarboxylic acid halide to a para-aramid polymer, in a mixture of N-methylpyrrolidone or dimethyl-acetamide and calcium chloride or lithium chloride, to obtain a dope wherein the polymer is dissolved in the mixture and wherein the dope is converted to fibrils by using a jet spin nozzle under a gas stream, followed by coagulating the fibrils using a coagulation jet.

In WO 2005/059247 the making of fibrids was described. According to this method the dope is converted to para-aramid fibrid film by spinning the dope through a jet spin nozzle to obtain a polymer stream, hitting the polymer stream with a coagulant at an angle wherein the vector of the coagulant velocity perpendicular to the polymer stream is at least 5 m/s (preferably at least 10 m/s) to coagulate the stream to para-aramid fibrid films. In another method described in this reference the dope is coagulated by means of a rotor-stator apparatus in which the polymer solution is applied through the stator on the rotor so that precipitating polymer fibrids are subjected to shear forces while they are in a plastic deformable stage.

A method of making pulp by using jet spinning has been disclosed in WO 2004/099476. According to this method the neutralized polymer solution is used for direct pulp spinning using a nozzle, contacting the polymer stream by pressurized air in a zone with lower pressure where the polymer stream is broken into droplets by expansion of the air. The droplets are attenuated into (pulp-like) fibers. Coagulation of the fibers or pulp-like fibers takes place using a suitable coagulant as e.g. water or water/NMP/$CaCl_2$. Instead of $CaCl_2$ other chlorides such as LiCl may also be used. By adjusting the polymer flow/air flow ratio the length and the fibrillation degree of the pulp can be changed. At high ratios long, less fibrillated pulp is obtained, while at low ratios a short, highly fibrillated pulp is obtained.

In U.S. Pat. No. 3,673,143 a method for making fibers was described using dopes that may contain usual additives such as dyes, fillers, delusterants, UV stabilizers, antioxidants, etc. To obtain stable dopes these however, contain the extremely poisonous hexamethyl-phosphoramide (HMPA).

The present invention also relates to novel spin dopes which lead to particles having improved properties, and which can be used as well in jet-spinning processes as in coagulation processes using a rotor-stator coagulator. The present dopes do not contain HMPA and are therefore only metastable. Surprisingly, the present dopes, although metastable by nature, can contain fillers and the like to high contents without crystallization or viscosity increase which would make the dope unsuitable for spinning processes Dopes according to the invention comprise aramid polymers such as explained above and further a solid additive material. The solvents of the dopes according to the invention are selected from N-methyl-2-pyrrolidone, N,N'-dimethylformamide, N,N'-dimethylacetamide, tetramethylurea, and mixtures thereof, and comprise 4 to 75 wt %, preferably 4-30 wt % of a composition consisting of 2 to 95 wt % of a para-aramid polymer and 5-98 wt %, preferably 10-98 wt %, more preferably 20-98 wt %, most preferably 40-98 wt % of a solid additive material, to a total of 100 wt %. The aramid polymer is dissolved in the solvent. These solvents are usually mixed with an alkali or earth alkali chloride, such as calcium chloride. Sulfuric acid as solvent is excluded from protection, which means that the aramid polymer obtained is free from sulfonic groups. Most preferred solvent system is NMP with $CaCl_2$. The additive materials can be any material that is commonly used as additive, including silicates such as kaolin and talc, diatomaceous earth, zeolite, graphite, mineral fibers, calcium carbonate, barium sulfate, mica, dyes, pigments such as $TiO_2$, metal particles, and the like. The invention allows spinning with particulates having an average diameter >0.1 µm up to 0.1 mm, and even greater. Most preferably, the additive material is non-fibrous additive or non-aramid fibrous additive. In another embodiment according to the invention the dope may further comprise a pigment for providing a color to the aramid product.

In a particularly preferred embodiment the invention pertains to a method for making the dope by
i) making a solution of a para-aromatic diamine monomer and a para-aromatic dicarboxylic acid halide monomer in a mixture of an alkali metal or an earth alkali metal chloride and a solvent selected from N-methyl-2-pyrrolidone, N,N'-dimethylformamide, N,N'-dimethylacetamide, tetramethylurea, and mixtures thereof;
ii) polymerizing the monomers to a para-aramid polymer, and
iii) at the same time of step ii), or therefore, or thereafter, adding solid additive material which is suitable for directly bonding to the polymer, to obtain the dope.

It can be expected that the dynamic viscosity increases as result of the addition of additives to the metastable dope, but quite unpredictably the anisotropic para-aramid solutions containing such additives could still be used as a spin dope. Thus the dope according to the invention can still be processed by the claimed methods of spinning and coagulating, to give particles, i.e. fibrid, fibril, or pulp.

It is further an advantage of the particles according to this invention that they contain substantially less water than conventional pulp, and the like. The addition of the solid particles to the spin dope leads to pulp, fibrils and fibrids having at least the same physical properties but having a higher dry solid content than those products made without additives. The dry solid content increases with increasing amounts of filler. The particles of the invention can therefore be easier dried and they contain less volume when transported. Dewatering of pulp slurry can simply be performed using a vacuum filter. According to a typical process vacuum of about 0.5 bar is applied for about 50 minutes, to obtain a pulp cake with a thickness of about 5 cm having a lower moisture content than conventional pulp without additive material.

The particles obtained differ from prior art particles in that they are not simply composed of mixtures of aramid and additive material, but that the additive materials, by adding it in the spinning dope, form together with the polymer a particle consisting of a composite of polymer and additive material. The additive materials thus in one or another way is directly bonded to the polymeric skeleton, and strongly contained therein because of mechanical, ionic, hydrogen bonding, and/or Vanderwaals forces. The expression "directly bonded" means that the additive materials is bonded to the aramid polymer without using chemical additives such as linking agents, or other auxiliary materials. The additive materials therefore cannot be separated from the polymer by filtration and washing procedure, or any other mechanical or chemical separation procedure other than dissolving the aramid polymer in a solvent wherein the additive material is insoluble. The particles of the present invention therefore do not or almost not contain free unbonded additive material. In particles of the prior art, containing unbonded or at the best weakly bonded additive materials, the additive materials can easily be separated from the polymer.

Due to this unique bonding between additive materials and polymer, such polymer-additive material composite particles have the following benefits over prior art particles:
  Simplifying paper process as there are no problems with retaining additive materials during the paper formation, and chemicals are not necessary for additive retention. Furthermore, there is no pollution of the system with additive.
  Achieving optimal adhesion between additive materials and polymer matrix.
  Added value of the products such as hardness, cut resistance, color (in case of use of pigments), and abrasion resistance.

Advantage of jet spinning or the coagulation technique over the route via yarn spinning and refining is that aramid particles can be obtained with much higher additive content. When first yarn has to be made, high additive content cannot be obtained (depending on the particle size, spinneret aperture and draw ratio the high additive content is defined as more than 5 wt %) because of clogging of spin filters, clogging of spinneret apertures, and continuously filament breakage. If so required the obtained product may be subjected to further conventional refining. The method is particularly useful for use even higher contents of additives in the dope, such as 10 wt %, 20 wt %, or even 40 wt % additive. The polymer-additive material composite particles can be processed into an article, more preferably into paper, brake pads, brake linings, or gaskets comprising said particle.

The invention is further illustrated by the following non-limitative examples.

Test Methods

Fiber Length

Fiber length measurement was done using the Pulp Expert™ FS (ex Metso). As length the average length (AL), the length weighted length (LL), weight weighted length (WL) were used. The subscript 0.25 means the respective value for particles with a length >250 micron. The amount of fines was determined as the fraction of particles having a length weighted length (LL) <250 micron. This instrument was calibrated with a sample with known fiber length. The calibration was performed with commercially available pulp as indicated in Table 1.

TABLE 1

| Commercially available samples | AL mm | LL mm | WL mm | $AL_{0.25}$ mm | $LL_{0.25}$ mm | $WL_{0.25}$ mm | Fines % |
|---|---|---|---|---|---|---|---|
| A | 0.27 | 0.84 | 1.66 | 0.69 | 1.10 | 1.72 | 26.8 |
| B | 0.25 | 0.69 | 1.31 | 0.61 | 0.90 | 1.37 | 27.5 |
| C | 0.23 | 0.78 | 1.84 | 0.64 | 1.12 | 1.95 | 34.2 |

A Kevlar ® 1F539, Type 979
B Twaron ® 1095
C Twaron ® 1099

SR Determination 2 g (dry weight) of never dried pulp fibers were dispersed in 1 L water during 250 beats in a Lorentz and Wettre desintegrator. A well-opened sample is obtained. The Schopper Riegler (SR) value is measured.

SSA Determination

Specific surface area ($m^2$/g) (SSA) was determined using adsorption of nitrogen by the BET specific surface area method, using a Tristar 3000 manufactured by Micromeretics. The dry pulp fibers samples were dried at 200° C. for 30 minutes, under flushing with nitrogen.

Paper Strength

Hand sheets with a diameter of 211 mm (50 g/$m^2$) were made of 50% pulp/fibril/fibrid and 50% Twaron® 6 mm fiber (Twaron® 1000) or as stated otherwise. Tensile index (Nm/g) was measured according to ASTM D828 and Tappi T494 om-96 on dried paper (120° C.), wherein sample width is 15 mm, sample length 100 mm, and test speed 10 mm/min at 21° C./65% RH conditions.

Optical Anisotropy (Liquid Crystal State)

Optical anisotropy is examined under a polarization microscope (bright image) and/or seen as opalescence during stirring.

Relative Viscosity

The sample was dissolved in sulfuric acid (96%) at room temperature at a concentration of 0.25% (m/v). The flow time of the sample solution in sulfuric acid was measured at 25° C. in an Ubbelohde viscometer. Under identical conditions the flow time of the solvent is measured as well. The viscosity ratio is then calculated as the ratio between the two observed flow times.

Dynamic Viscosity

The dynamic viscosity was measured using Thermo Electron Rheostress 600 rotational rheometer. The geometry used is a 35 mm diameter cone-plate with a cone angle of 4°. Measurements were carried out at 23° C.

Elemental Analysis

The carbon, nitrogen, hydrogen and sulfur content are determined with the elemental analyzer Euro EA3000. The sample is completely combusted (dynamic flash) in a tin cup at 1000° C. with the help of oxygen gas. Subsequently the amount of free carbon dioxide, water, nitrogen gases and sulfur dioxides formed are determined via gas chromatography.

The para-phenyleneterephthalamide content is calculated from the nitrogen and/or the carbon content of the sample.

The kaolin content (%) was considered as 100—PPTA content.

The stability is judged by visual inspection of the solution with regard to the presence of local changes in clarity. Turbid spots are indicative of the formation of crystals.

EXAMPLE 1

Polymerization of para-phenyleneterephthalamide was carried out using a 160 L Drais reactor. After sufficiently drying the reactor, 64 L of NMP/$CaCl_2$ (N-methylpyrrolidone/calcium chloride) with a $CaCl_2$ concentration of 2.5 wt % were added to the reactor. Subsequently, 1522 g of para-phenylenediamine (PPD) were added and dissolved at room temperature. Thereafter the PPD solution was cooled to 5° C. and 2824 g of terephthaloyl dichloride (TDC) were added. After addition of the TDC the polymerization reaction was continued for 45 min. Then the polymer solution was neutralized with a calcium oxide/NMP-slurry (780 g of CaO in NMP). After addition of the CaO-slurry the polymer solution was stirred for another 30 min. This neutralization was carried out to remove the hydrochloric acid (HCl), which is formed during polymerization. A gel-like polymer solution was obtained with a PPTA content of 4.5 wt % and having a relative viscosity of 3.0 (in 0.25% $H_2SO_4$). After neutralization 31.7 Kg of the polymer solution was discharged from the reactor. To the 42.3 Kg of the remaining solution 18 Kg of natural graphite (Graphit Kropfmühl AG, very fine grinding AF 96/97 with particle size distribution 99.7%<40 µm, d10≦40 µm, d50: 8.5-11 µm, d90≦25 µm) and 11 L of NMP was added. The mixture was stirred for 30 minutes, after which the solution was transferred to a vessel. The dynamic viscosity of the PPTA solution in NMP/$CaCl_2$ with the added graphite was found to be 224 Pa·s at a shear rate of 1 $s^{-1}$.

The solution was spun through a jet spinning nozzle (spinning hole 500 µm) at 9.9 Kg/h. Water was added through a ring-shaped channel flowing perpendicular to the polymer flow with 225 L/h. The fibrids, consisting of 90% graphite and 10% PPTA, were collected and were subsequently washed in order to remove NMP/$CaCl_2$. The fibrids were characterized having an SSA of 14.2 $m^2$/g and an SR value of 35° SR. A paper consisting of 50% of these fibrids and 50% Twaron 6 mm fiber was made resulting in a TI of 2 Nm/g.

EXAMPLE 2

Polymerization of para-phenyleneterephthalamide was carried out using a 2.5 $m^3$ Drais reactor. After sufficiently drying the reactor, 1098 L of NMP/$CaCl_2$ with a $CaCl_2$ concentration of 2.5 wt % were added to the reactor. Subsequently, 27.20 Kg of para-phenylenediamine were added and dissolved at room temperature. Thereafter the PPD solution was cooled to 5° C. and 50.26 Kg of terephthaloyl dichloride were added. After addition of the TDC the polymerization reaction was continued for 45 min. Then the polymer solution was neutralized with a calcium oxide/NMP-slurry (13.9 Kg of CaO in 44 L of NMP). After addition of the CaO-slurry the polymer solution was stirred for another 30 min. This neutralization was carried out to remove the hydrochloric acid, which is formed during polymerization. After the neutralization the polymer solution was diluted to 3.6% with 320 L of NMP. After adding the NMP the polymer solution was stirred another 30 min. A gel-like polymer solution was obtained with a PPTA content of 3.6 wt % and having a relative viscosity of 2.5 (in 0.25% $H_2SO_4$).

A specific amount of kaolin (Laude SP20, with particle size distribution 98%<20 µm, d50=1.4 µm) was mixed in the 2.5 $m^3$ Drais reactor filled with the PPTA solution in NMP/$CaCl_2$ to a content as indicated in Table 1 and 2. The mixture was stirred for 30 minutes, after which a spinning run was performed with part of the kaolin filled polymer solution.

After a spinning run an extra amount of kaolin was added to the remaining solution to a content as indicated in Table 1 and 2. Again a spinning run was performed with a part of the solution. This was repeated until 80% of kaolin with respect to dry product (pulp or fibrid) was added and spun.

The specific solutions were spun into fibrids through a 6 hole jet spinning nozzle (spinning holes 500 μm) at 132 Kg/h. NMP/CaCl$_2$/water (30 wt %/1.2 wt %/68.8% wt %) was added through a ring-shaped channel flowing perpendicular to the polymer flow with different flows and pressures resulting in the different fibrid types as mentioned in Table 2.

The specific solutions were spun into pulp through a 20 holes jet spinning nozzle (spinning holes 350 μm) at a flow as mentioned in Table 1. The solution was spun into a zone of lower pressure. An air jet, with a pressure and flow as mentioned in Table 1, was separately applied perpendicularly to the polymer stream through ring-shaped channels to the same zone were expansion of air occurred. Thereafter, the pulp was coagulated (NMP/CaCl$_2$/water; 30 wt %/1.2 wt %/68.8 wt %) in the same zone by means of applying a coagulant jet (600 or 900 L/h) through ring-shaped channels under an angle in the direction of the polymer stream.

The fibrids and pulp, consisting of x % kaolin and 100-x % PPTA as indicated in Table 1 and 2, were collected and subsequently washed in order to remove NMP/CaCl$_2$. After washing the pulp or fibrids are dewatered to a dry solids content as mentioned in Table 1 and 2. The fibrids and pulp were characterized with respect to length, specific surface area and SR value and from a series of samples the kaolin content is analyzed by means of elemental analysis (see Table 1, 2).

TABLE 1

Additive containing Jet Spun Pulp (additive is kaolin) or kaolin filled Jet Spun Pulp.

| sample | Kaolin (wt %) | Polymer sol. flow (Kg/h) | Air pressure (bar) | Air flow (Nm$^3$/h) | LL$_{0.25}$ (mm) | Fines (%) | SR (° SR) | Dry solids (%) | Kaolin analyzed (wt %) |
|---|---|---|---|---|---|---|---|---|---|
| A | 0 | 198 | 2.6 | 82 | 0.69 | 37.0 | 38 | 8.1 | n.d. |
| B | 0 | 165 | 4.0 | 114 | 0.62 | 41.6 | 53 | 7.4 | n.d. |
| C | 20 | 198 | 2.6 | 82 | 0.66 | 40.6 | 39 | 8.5 | n.d. |
| D | 20 | 132 | 4.1 | 122 | 0.59 | 46.6 | 64 | 9.4 | 20 |
| E | 40 | 198 | 2.6 | 80 | 0.64 | 41.8 | 30 | 13.0 | n.d. |
| F | 40 | 132 | 4.1 | 120 | 0.56 | 51.2 | 59 | 12.2 | 40 |
| G | 60 | 198 | 2.6 | 80 | 0.63 | 43.0 | 30 | 16.0 | 60 |
| H | 60 | 132 | 4.0 | 115 | 0.56 | 51.4 | 49 | 16.0 | n.d. |
| I | 80 | 132 | 4.0 | 113 | 0.58 | 50.2 | 37 | 20.0 | 80 | n.d. = not determined

TABLE 2

Additives containing Jet Spun Fibrids (additive is kaolin) or kaolin filled Jet Spun Fibrids.

| sample | Kaolin (wt %) | Coagulant pressure (bar) | Coagulant flow (Nm$^3$/h) | LL$_{0.25}$ (mm) | Fines (%) | SR (° SR) | Dry solids (%) | Kaolin analyzed (wt %) |
|---|---|---|---|---|---|---|---|---|
| J | 10 | 22 | 1100 | 0.86 | 27.2 | 37 | 8.7 | 11 |
| K | 20 | 21 | 890 | 0.88 | 24.8 | 41 | 9.8 | n.d. |
| L | 20 | 27 | 1030 | 0.76 | 28.5 | 58 | 10.3 | 20 |
| M | 40 | 20 | 1030 | 0.82 | 27.2 | 40 | 12.3 | n.d. |
| N | 40 | 26 | 1175 | 0.74 | 29.6 | 63 | 11.9 | 40 |
| O | 60 | 25 | 1030 | 0.84 | 26.8 | 39 | 16.6 | 60 |
| P | 80 | 25 | 1040 | 0.84 | 27.8 | 28 | 21.4 | 79 | n.d. = not determined

EXAMPLE 3

Polymerization of para-phenyleneterephthalamide was carried out using a 160 L Drais reactor. After sufficiently drying the reactor, 64 L of NMP/CaCl$_2$ with a CaCl$_2$ concentration of 2.5 wt % were added to the reactor. Subsequently, 1522 g of para-phenylenediamine were added and dissolved at room temperature. Thereafter the PPD solution was cooled to 5° C. and 2823 g of terephthaloyl dichloride were added. After addition of the TDC the polymerization reaction was continued for 45 min. Then the polymer solution was neutralized with a calcium oxide/NMP-slurry (780 g of CaO in NMP). After addition of the CaO-slurry the polymer solution was stirred for another 30 min. This neutralization was carried out to remove the hydrochloric acid, which is formed during polymerization. After the neutralization the polymer solution was diluted to 3.6% with 18 L of NMP. After adding the NMP the polymer solution was stirred another 30 min. A gel-like polymer solution was obtained with a PPTA content of 3.6 wt % and having a relative viscosity of 2.3 (in 0.25% H$_2$SO$_4$).

EXAMPLE 4

28.6 g of talcum (I.M.I. Talco HM 05 with particle size distribution 99%<10 μm, 96%<5 μm, 65%<2 μm and 32%<1 μm) were mixed in a 10 L Drais reactor with 7.16 Kg of the polymer solution of Example 3. The mixture was stirred for 30 minutes at 150 rpm, after which the solution was discharged from the reactor. The dynamic viscosity of the PPTA solution in NMP/CaCl$_2$ with the added talcum was found to be 36 Pa·s at a shear rate of 1 s$^{-1}$. A second mixture was prepared in the same way by mixing 1.03 Kg of talcum with 7.16 Kg of the PPTA solution. The dynamic viscosity of the PPTA solution in NMP/CaCl$_2$ with the added talcum was found to be 48 Pa·s at a shear rate of 1 s$^{-1}$.

Part of the talcum containing solutions, about 50 gram, was coagulated in a Waring Blender in a water/NMP (70 wt %/30 wt %) mixture. After coagulation the pulp-like products, consisting of respectively 10% and 80% talcum and 90% and 20% PPTA, were extensively washed in order to remove NMP/CaCl$_2$. The obtained filtrates were completely clear meaning that visually no free Talcum could be observed. The 10% talcum/90% PPTA product was characterized having an SR value of 38° SR and a LL$_{0.25}$ of 0.48 mm. The 80% talcum/20% PPTA product was characterized having an SR value of 20° SR and a LL$_{0.25}$ of 0.47 mm.

EXAMPLE 5

20.7 g of kaolin (Laude SP20, with particle size distribution 98%<20 μm, d50: 1.4 μm) were mixed in a 10 L Drais reactor with 5.17 Kg of the polymer solution of Example 3. The mixture was stirred for 30 minutes at 150 rpm, after which the solution was discharged from the reactor. The dynamic viscosity of the PPTA solution in NMP/CaCl$_2$ with the added kaolin was found to be 37 Pa·s at a shear rate of 1 s$^{-1}$. A second mixture was prepared in the same way by mixing 744 g of kaolin with 5.17 Kg of the PPTA solution. The dynamic viscosity of the PPTA solution in NMP/CaCl$_2$ with the added Kaolin was found to be 135 Pa·s at a shear rate of 1 s$^{-1}$.

Part of the kaolin containing solutions, i.e. about 50 grams, was coagulated in a Waring Blender in a water/NMP (70 wt %/30 wt %) mixture. After coagulation the pulp-like products, consisting of respectively 10% and 80% Kaolin and 90% and 20% PPTA, were extensively washed in order to remove NMP/CaCl$_2$. The obtained filtrates were completely clear meaning that visually no free kaolin could be observed. The 10% kaolin/90% PPTA product was characterized having an SR value of 37° SR and a LL$_{0.25}$ of 0.47mm. the 80% kaolin/20% PPTA product was characterized having an SR value of 12° SR and a LL$_{0.25}$ of 0.39 mm.

EXAMPLE 6

137.3 g of mineral fibers (Lapinus Fibres, RF 2197, fiber length 400 +/−100 μm) were mixed in a 10 L Drais reactor with 5.71 Kg of the polymer solution of Example 3. The mixture was stirred for 30 minutes at 150 rpm, after which the solution was discharged from the reactor.

Part of the mineral fiber containing solution, about 50 grams, was coagulated in a Waring Blender in a water/NMP (70 wt %/30 wt %) mixture. After coagulation the pulp-like product, consisting of 40% mineral fibers and 60% PPTA, was extensively washed in order to remove NMP/CaCl$_2$. The pulp-like product was characterized having an SR value of 17° SR and a LL$_{0.25}$ of 0.51 mm. A (50 g/m$^2$) paper consisting of 50% of this pulp-like product and 50% Twaron 6 mm fiber was made resulting in a TI of 1.35 Nm/g.

EXAMPLE 7

822 g of mineral fibers (Lapinus Fibres, RF 2197, fiber length 400 +/−100 μm) were mixed in a 10 L Drais reactor with 5.71 Kg of the polymer solution of Example 3. The mixture was stirred for 30 minutes at 150 rpm, after which the solution was discharged from the reactor. The dynamic viscosity of the PPTA solution in NMP/CaCl$_2$ with the added mineral fibers was found to be 300 Pa·s at a shear rate of 1 s$^{-1}$.

Part of the mineral fiber containing solution, about 50 gram, was coagulated in a Waring Blender in a water/NMP (70 wt %/30 wt %) mixture. After coagulation the pulp-like product, consisting of 80% mineral fibers and 20% PPTA, was extensively washed in order to remove NMP/CaCl$_2$. The pulp-like product was characterized having an SR value of 12° SR and a LL$_{0.25}$ of 0.50 mm.

EXAMPLE 8

A polymerization of para-phenyleneterephthalamide was carried out in the same way as in Example 3. A gel-like polymer solution was obtained with a PPTA content of 3.6 wt % and having a relative viscosity of 2.1 (in 0.25% H$_2$SO$_4$).

30.5 g of diatomaceous earth (EachlePicher, Celatom® MN-23 with particle size distribution 0.3% >44 μm (325 mesh)) were mixed in a 10 L Drais reactor with 7.63 Kg of the 3.6% PPTA polymer solution in NMP/CaCl$_2$ having a relative viscosity of 2.1 (in 0.25% H$_2$SO$_4$). The mixture was stirred for 30 minutes at 150 rpm, after which the solution was discharged from the reactor. The dynamic viscosity of the PPTA solution in NMP/CaCl$_2$ with the added Celatom was found to be 22 Pa·s at a shear rate of 1 s$^{-1}$. A second mixture was prepared in the same way by mixing 1.10 Kg of Celatom with 7.63 Kg of the PPTA solution. The dynamic viscosity of the PPTA solution in NMP/CaCl$_2$ with the added Celatom was found to be 38 Pa·s at a shear rate of 1 s$^{-1}$.

Part of the Celatom containing solutions, ~50 gram, was coagulated in a Waring Blender in a water/NMP (70 wt %/30 wt %) mixture. After coagulation the pulp-like products, consisting of respectively 10% and 80% Celatom and 90% and 20% PPTA, were extensively washed in order to remove NMP/CaCl$_2$. The obtained filtrates were completely clear meaning that visually no free Celatom could be observed. The 10% Celatom/90% PPTA product was characterized having an SR value of 29° SR and a LL$_{0.25}$ of 0.49 mm. The 80% Celatom/20% PPTA product was characterized having an SR value of 13° SR and a LL$_{0.25}$ of 0.47 mm.

EXAMPLE 9

60 g/h of a 20 wt % SiO$_2$/MgO$_2$ (70/30 wt %) dispersion in sulfuric acid (99.8%) were injected into a 19.8 wt % PPTA solution in sulfuric acid (606 g/h). The PPTA/SiO$_2$ solution was extruded through a jet spinning nozzle. Nozzle temperature was 90° C., air pressure 7 bar, coagulant (water) pressure 6 bar, water flow 600 L/hr. After spinning the fibers were collected in a 60 L vessel with water and replacing the water 2 times by clean water. The relative viscosity of the fibers was 4.1. The fiber length was <1 cm, pH neutral. SiO$_2$ content was 4.3%.

After spinning the wet fibers were fed to a Sprout Waldron lab refiner by adding them manually through a funnel together with a water jet (18° C.) resulting in a consistency of approximately 0.125% for the first refining passage. Thereafter the fibers were concentrated by dewatering on a sieve table to a concentration of 0.25 g/L. A second refining step was performed by circulating the pulp over the refiner, and closing the gap width between the plates until the required length was achieved. After refining the pulp contained 2.6% of SiO$_2$. Pulp length as measured by the Kajaani (WL$_{0.25}$ mm) was 1.36, SSA 3.96 m$^2$/g. The color of this sheet was clearly darker than that of a sheet without the additive SiO$_2$.

EXAMPLE 10

A hand sheet was made of fibrids from Example 2 sample M with 40% bonded kaolin (SR 40) and Twaron® short cut fiber (6 mm). 12.8 g of wet fibrids (consisting of 0.91 g dry PPTA+0.61 g kaolin and the rest water) were mixed with 0.91 g of 6 mm fiber. Overall retention (the amount of mass retained after drying/added dry mass) was 93% and the tensile index of the paper was 25.9 Nm/g (see Table 3).

EXAMPLE 11

A hand sheet was made of fibrids from example 2 sample P with 80% bonded kaolin (SR 28) and Twaron® short cut fiber (6 mm). 20.7 g of wet fibrids (consisting of 0.91 g PPTA+3.64 g kaolin and rest water) was mixed with 0.91 g of 6 mm fiber. Overall retention (the amount of mass retained after drying/added mass) was 102% and the tensile index of the paper was 12.4 Nm/g (see Table 3).

COMPARATIVE EXAMPLE 1

A hand sheet was made of 100% PPTA fibrids (SR 39), kaolin powder and Twaron® short cut fiber (6 mm). 3.64 g of kaolin powder were mixed with 0.91 g PPTA and 0.91 g of 6 mm Twaron® fiber. Overall retention was only 45% (see Table 3).

The comparative example shows that when the kaolin is not bonded to the fibrids the retention of the kaolin is low and a paper is obtained with a low tensile index compared to the paper from example 9 having comparable paper weight.

TABLE 3

Paper making results of Examples 10, 11, and Comparative example 1.

|  | Degree SR fibrids | Mass added (g) | Kaolin added/total added mass (wt/wt %) | Mass retained (g) | Overall mass retention (wt/wt %) | Tensile Index (Nm/g) |
| --- | --- | --- | --- | --- | --- | --- |
| Example 10 | 40 | 2.43 | 25 | 2.25 | 93 | 25.9 |
| Example 11 | 28 | 5.46 | 67 | 5.58 | 102 | 12.4 |
| Comparative example 1 | 39 | 5.46 | 67 | 2.46 | 45 | 16.2 |

EXAMPLE 12

A hand sheet was made of fibrids from Example 2 sample N with 40% bonded kaolin (SR 63) and Twaron® short cut fiber (6 mm). 12.8 g of wet fibrids (consisting of 0.91 g dry PPTA+0.61 g kaolin and rest water) were mixed with 0.91 g of 6 mm fiber. Overall retention (the amount of mass retained after drying/added mass) was 89% and the tensile index of the paper was 36.8 Nm/g (see Table 4).

COMPARATIVE EXAMPLE 2

A hand sheet was made of 100% PPTA fibrids (SR 57), kaolin powder and Twaron®) short cut fiber (6 mm). 0.62 g of kaolin powder were mixed with 0.91 g PPTA and 0.91 g of 6 mm Twaron® fiber. Overall retention was 82% and the tensile index (29.5 Nm/g) was much lower than in Example 11 (see Table 4).

COMPARATIVE EXAMPLE 3

A hand sheet was made of 100% PPTA fibrids (SR 57), kaolin powder and 6 mm of Twaron® short cut fiber (6 mm). 3.64 g of kaolin powder were mixed with 0.91 g of PPTA and 0.91 g of 6 mm Twaron® fiber. Overall retention was only 45% based on paper weight and the tensile index was 20.4 Nm/g (see Table 4).

The comparative examples show that when the kaolin is not bonded to the fibrids both the retention and the resulting paper strength is lower than compared with Example 12. By adding more kaolin (Comparative example 3) the same paper weight and the same kaolin content is realized, but the tensile index is much lower.

TABLE 4

Paper making results of Example 12 and Comparative examples 2 and 3.

|  | Degree SR fibrids | Mass added (g) | Kaolin added/total added mass (wt/wt %) | Mass retained (g) | Overall retention (%) | Tensile Index (Nm/g) |
| --- | --- | --- | --- | --- | --- | --- |
| Example 12 | 63 | 2.43 | 25 | 2.16 | 89 | 36.8 |
| Comparative example 2 | 57 | 2.44 | 25 | 2.00 | 82 | 29.5 |
| Comparative example 3 | 57 | 5.46 | 67 | 2.67 | 45 | 20.4 |

EXAMPLE 13

Polymerization of para-phenyleneterephthalamide was carried out using a 160 L Drais reactor. After sufficiently drying the reactor, 64 L of NMP/$CaCl_2$ having a $CaCl_2$ concentration of 2.5 wt % were added to the reactor. Subsequently, 1522 g of para-phenylenediamine were added and dissolved at room temperature. Thereafter the PPD solution was cooled to 5° C. and 2812 g of terephthaloyl dichloride (solid) were added. After addition of the TDC the polymerization reaction was continued for 45 min. Then the polymer solution was neutralized with a calcium oxide/NMP-slurry (777 g of CaO in NMP). After addition of the CaO-slurry the polymer solution was stirred for another 30 min. This neutralization was carried out to remove the hydrochloric acid, which is formed during polymerization. A gel-like polymer solution was obtained with a PPTA content of 4.5 wt % and having a relative viscosity of 2.2 (in 0.25% $H_2SO_4$).

Different amounts, according to Table 5, of kaolin (Laude SP20, with particle size distribution 98% <20 μm, d50=1.4

μm) were mixed in a 10 L Drais reactor with 4 Kg of the polymer solution. The mixture was stirred for 15 minutes at 200 rpm, after which the solution was discharged from the reactor. After discharging the dopes were judged on their stability, and the results are mentioned in Table 6.

TABLE 5

Amount of kaolin added to 4 Kg of solution

| % filler | kaolin (Kg) |
|---|---|
| 0 | 0.000 |
| 5.3 | 0.010 |
| 10 | 0.020 |
| 18.3 | 0.040 |
| 20 | 0.045 |
| 30.6 | 0.080 |
| 40 | 0.120 |
| 80 | 0.720 |

The percentage kaolin was calculated as wt % kaolin of total amount of solids (i.e. kaolin+PPTA).

EXAMPLE 14

The procedure of Example 13 was repeated, however with 2.823 Kg of terephthaloyl dichloride (liquid) and 780 g of CaO. A gel-like polymer solution was obtained with a PPTA content of 4.5 wt % and having a relative viscosity of 2.4 (in 0.25% $H_2SO_4$). Kaolin was added to the dope as described in Example 13 and the results are shown in Table 6

EXAMPLE 15

The procedure of Example 13 was repeated, however with 2.823 Kg of terephthaloyl dichloride (solid) and 780 g of CaO. A gel-like polymer solution was obtained with a PPTA content of 4.5 wt % and having a relative viscosity of 2.6 (in 0.25% $H_2SO_4$). Kaolin was added to the dope as described in Example 13 and the results are shown in Table 6.

EXAMPLE 16

Polymerization of para-phenyleneterephthalamide was carried out using a 2.5 m³ Drais reactor. After sufficiently drying the reactor, 1105 L of NMP/$CaCl_2$ having a $CaCl_2$ concentration of 2.5 wt % were added to the reactor. Subsequently, 30.00 Kg of para-phenylenediamine were added and dissolved at room temperature. Thereafter the PPD solution was cooled to 5° C. and 55.49 Kg of terephthaloyl dichloride were added. After addition of the TDC the polymerization reaction was continued for 45 min. Then the polymer solution was neutralized with a calcium oxide/NMP-slurry (15.3 Kg of CaO in 44 L of NMP). After addition of the CaO-slurry the polymer solution was stirred for another 30 min. This neutralization was carried out to remove the hydrochloric acid, which is formed during polymerization. After the neutralization the polymer solution was diluted to 4.0% with NMP. A gel-like polymer solution was obtained with a PPTA content of 5.0 wt % and a relative viscosity of 2.7 (in 0.25% $H_2SO_4$).

To this polymer solution 43.7 Kg of kaolin (Laude SP20, with particle size distribution 98% <20 μm, d50=1.4 μm) in 195 L NMP were added and stirred for another 30 min. resulting in a Kaolin content of 40% in the washed and dried product.

After a spinning run an extra amount of kaolin was added to the remaining solution resulting in a Kaolin content of 80% in the washed and dried product. The polymer solution dopes were judged on their stability as indicated in Table 6.

The above examples 13-16 gave the following results:

TABLE 6

Stability of PPTA dopes with different amounts of Kaolin

| Polymer solution from Example | $\eta_{rel}$ | PPTA (%) in dope | kaolin (%) in dope | PPTA + kaolin (%) in dope | kaolin (%) in pulp/fibrid | stability (days) |
|---|---|---|---|---|---|---|
| 13 | 2.2 | 4.5 | 0.0 | 4.5 | 0 | 5 |
| 13 | | 4.5 | 0.5 | 5.0 | 10 | 5 |
| 13 | | 4.4 | 1.1 | 5.6 | 20 | 5 |
| 13 | | 4.4 | 2.9 | 7.3 | 40 | 5 |
| 13 | | 3.8 | 15.3 | 19.1 | 80 | 5 |
| 14 | 2.4 | 4.5 | 0.0 | 4.5 | 0 | 5 |
| 14 | | 4.5 | 0.3 | 4.7 | 5.3 | 5 |
| 14 | | 4.5 | 0.5 | 5.0 | 10 | 5 |
| 14 | | 4.5 | 1.0 | 5.5 | 18.3 | 5 |
| 14 | | 4.4 | 1.1 | 5.6 | 20 | 5 |
| 14 | | 4.4 | 1.9 | 6.4 | 30.6 | 5 |
| 14 | | 4.4 | 2.9 | 7.3 | 40 | 5 |
| 14 | | 3.8 | 15.3 | 19.1 | 80 | 5 |
| 15 | 2.6 | 4.5 | 0.0 | 4.5 | 0 | 9 |
| 15 | | 4.5 | 0.5 | 5.0 | 10 | 11 |
| 15 | | 4.4 | 1.1 | 5.6 | 20 | 12 |
| 15 | | 4.4 | 2.9 | 7.3 | 40 | 14 |
| 15 | | 3.8 | 15.3 | 19.1 | 80 | 17 |
| 16 | 2.7 | 5.0 | 0.0 | 5.0 | 0 | 8 |
| 16 | | 3.9 | 2.6 | 6.5 | 40 | 34 |
| 16 | | 3.4 | 13.8 | 17.2 | 80 | 51 |

In all examples the stability of the dope is at least as good as of dopes without filler. Surprisingly, in many instances the stability is even improved in comparison with dopes without kaolin filler.

The invention claimed is:

1. A method for making a polymer-additive composite pulp, fibril or fibrid from a dope by:
   i) jet spinning the dope through a jet spin nozzle to obtain the pulp, fibril or fibrid, the dope including (a) a solvent that is selected from the group consisting of N-methyl-2-pyrrolidone, N,N'-dimethylformamide, N,N'-dimethylacetamide, tetramethylurea, and mixtures thereof; and (b) 4 to 75 wt % of a composition consisting of a para-aramid polymer and a solid additive, the para-aramid polymer being present in the composition in an amount of 2 to 80 wt % and the solid additive material being present in the composition in an amount of 20 to 98 wt %; wherein the para-aramid polymer is dissolved in the solvent; or ii) coagulating the dope to obtain the pulp, fibril or fibrid by means of a rotor-stator apparatus, in which the dope is applied through the stator on the rotor so that polymer-additive composite pulp, fibril or fibrid are precipitated and subjected to shear forces while the polymer-additive composite pulp, fibril or fibrid are in a plastic deformable stage, wherein said pulp, fibril or fibrid comprises a para-aramid polymer and a solid additive, the dope including (a) a solvent that is selected from the group consisting of N-methyl-2-pyrrolidone, N,N'-dimethylformamide, N,N'-dimethylacetamide, tetra-methylurea, and mixtures thereof; and (b) 4 to 75 wt % of a composition consisting of a para-aramid polymer and a solid additive, the para-aramid polymer being present in the composition in an amount of 2 to 80 wt % and the solid additive material being present in the composition in an amount of 20 to 98 wt %; wherein the para-aramid polymer is dissolved in the solvent.

2. A method for making a polymer-additive material composite fibrid film from a dope by:

i) spinning the dope through a jet spin nozzle to obtain a polymer stream, the dope including (a) a solvent that is selected from the group consisting of N-methyl-2-pyrrolidone, N,N'-dimethylformamide, N,N'-dimethylacetamide, tetramethylurea, and mixtures thereof; and (b) 4 to 75 wt. % of a composition consisting of a para-aramid polymer and a solid additive, the para-aramid polymer being present in the composition in an amount of 2 to 80 wt % and the solid additive material being present in the composition in an amount of 20 to 98 wt %; wherein the para-aramid polymer is dissolved in the solvent; and ii) hitting the polymer stream with a coagulant at an angle wherein a vector of coagulant velocity perpendicular to the polymer stream is at least 5 m/s to coagulate the polymer stream and obtain the fibrid film.

3. The method according to claim 2, wherein the vector of the coagulant velocity perpendicular to the polymer stream is at least 10 m/s.

4. A method for making a polymer-additive material composite pulp or fibril from a dope by:

i) converting the dope to pulp or fibrils by using a jet spin nozzle under a gas stream, the dope including (a) a solvent that is selected from the group consisting of N-methyl-2-pyrrolidone, N,N'-dimethylformamide, N,N'-dimethylacetamide, tetramethylurea, and mixtures thereof; and (b) 4 to 75 wt. % of a composition consisting of a para-aramid polymer and a solid additive, the para-aramid polymer being present in the composition in an amount of 2 to 80 wt % and the solid additive material being present in the composition in an amount of 20 to 98 wt %; wherein the para-aramid polymer is dissolved in the solvent; and then ii) coagulating the pulp or fibrils using a coagulation jet.

\* \* \* \* \*